(12) United States Patent
Vagner et al.

(10) Patent No.: US 11,984,980 B2
(45) Date of Patent: May 14, 2024

(54) TECHNIQUES FOR BEAM INFORMATION TRANSMISSION AND PUNCTURED CHANNEL INDICATION

(71) Applicant: QUALCOMM Incorporated, San Diego, CA (US)

(72) Inventors: Shmuel Vagner, Raanana (IL); Senthilkumar Sundaram, San Diego, CA (US); Abhishek Saurabh Sachidanand Sinha, Malmö (SE); Orod Raeesi, Espoo (FI); Roberto Airoldi, Espoo (FI); Deepak Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/325,022

(22) Filed: May 19, 2021

(65) Prior Publication Data

US 2022/0376823 A1    Nov. 24, 2022

(51) Int. Cl.
*H04L 1/00*    (2006.01)
*H04B 7/06*    (2006.01)
*H04L 5/00*    (2006.01)

(52) U.S. Cl.
CPC ......... *H04L 1/0069* (2013.01); *H04B 7/0617* (2013.01); *H04B 7/0634* (2013.01); *H04L 5/0051* (2013.01); *H04L 5/0053* (2013.01)

(58) Field of Classification Search
CPC ... H04L 1/0069; H04L 5/0051; H04L 5/0053; H04B 7/0617; H04B 7/0634
See application file for complete search history.

(56) References Cited

U.S. PATENT DOCUMENTS

2021/0120531 A1\* 4/2021 Jeon ................. H04W 72/046
2021/0120538 A1\* 4/2021 Huh ................... H04L 5/0023
(Continued)

FOREIGN PATENT DOCUMENTS

WO    WO-2021075917 A1    4/2021

OTHER PUBLICATIONS

NPL Publication "O-RAN Working Group 4 (Open Fronthaul Interfaces WG) Control, User and Synchronization Plane Specification", "O-RAN.WG4.CUS.0-v07.02", Prepared by the O-Ran Alliance Copyright © 2021 (Year: 2021).\*
(Continued)

*Primary Examiner* — Jackie Zuniga Abad
(74) *Attorney, Agent, or Firm* — Holland & Hart LLP

(57) ABSTRACT

Methods, systems, and devices for wireless communication are described. Some wireless communications network may operate in accordance with an open-RAN (ORAN) network specification which may support functional splitting between the ORAN distributed unit (O-DU) and the ORAN radio unit (RU). The O-DU may communicate with the O-RU using control messaging. The control message may include a resource resource element (RE) mask and a resource symbol mask, the resource RE mask indicating frequency resources to be allocated for a reference signal transmission across a set of antenna ports and the resource symbol mask indicating time resources to be allocated for the reference signal transmission. Additionally or alternatively, the O-DU may transmit a control message including a puncturing resource RE mask indicating frequency resources for applying a puncturing pattern and a symbol mask indicating time resources for applying the puncturing pattern during a transmission.

30 Claims, 12 Drawing Sheets

(56) References Cited

U.S. PATENT DOCUMENTS

2021/0135722 A1   5/2021  Ahmed et al.
2021/0400679 A1*  12/2021 Österling .............. H04L 5/0048

OTHER PUBLICATIONS

International Search Report and Written Opinion—PCT/US2022/072388—ISA/EPO—dated Aug. 25, 2022.
O-Ran Fronthaul Working Group: "Control, User and Synchronization Plane Specification", Technical Specification—O-RAN.WG4. CUS. 0-V03.00—O-Ran Fronthaul Working Group: Control, User and Synchronization Plane Specification, O-RAN, vol. O-RAN. WG4.CUS. 0-v03.00, Apr. 1, 2020, pp. 1-253, XP009530675, p. 25-p. 26 p. 53 p. 100.

* cited by examiner

TECHNIQUES FOR BEAM INFORMATION TRANSMISSION AND PUNCTURED CHANNEL INDICATION

FIELD OF TECHNOLOGY

The following relates to wireless communication, including techniques for beam information transmission and punctured channel indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications networks may support an open radio access network (O-RAN) architecture to support interoperability between devices and systems. Some signaling techniques supporting the O-RAN architecture, however, may be deficient.

SUMMARY

The described techniques relate to improved methods, systems, devices, and apparatuses that support techniques for beam information transmission and punctured channel indication. Generally, the described techniques provide for efficient interoperability between wireless communications devices associated with a multivendor RAN, a wireless communications network may operate in accordance with an open-RAN (ORAN) network specification. ORAN operation may reduce fronthaul transmission bandwidth associated with fifth generation (5G)/New Radio (NR) or Long Term Evolution (LTE) networks by supporting functional splitting between the O-RAN distributed unit (O-DU) and the ORAN radio unit (O-RU), which may be located at a base station. The O-DU communicate with the O-RU using control messaging.

The O-DU may configure a control message to include beam information for multiple antenna ports. In particular, the control message may include a resource resource element (RE) mask and a resource symbol mask. The resource RE mask may indicate one or more frequency resources to be allocated for a reference signal transmission across multiple antenna ports and the resource symbol mask may indicate one or more time resources to be allocated for the reference signal transmission. Additionally or alternatively, the O-DU may configure a control message to include puncturing information for a channel. The control message may include a puncturing resource RE mask and a symbol mask. The puncturing resource RE mask may indicate one or more frequency resources for applying a puncturing pattern and the symbol mask may indicate one or more time resources for applying the puncturing pattern during a transmission.

A method for wireless communication at a wireless communications device associated with a base station is described. The method may include receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission and performing the reference signal transmission in accordance with the control message including the resource RE mask and the resource symbol mask.

An apparatus for wireless communication at a wireless communications device associated with a base station is described. The apparatus may include a processor, memory coupled with the processor, and instructions stored in the memory. The instructions may be executable by the processor to cause the apparatus to receive a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission and perform the reference signal transmission in accordance with the control message including the resource RE mask and the resource symbol mask.

Another apparatus for wireless communication at a wireless communications device associated with a base station is described. The apparatus may include means for receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission and means for performing the reference signal transmission in accordance with the control message including the resource RE mask and the resource symbol mask.

A non-transitory computer-readable medium storing code for wireless communication at a wireless communications device associated with a base station is described. The code may include instructions executable by a processor to receive a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission and perform the reference signal transmission in accordance with the control message including the resource RE mask and the resource symbol mask.

Some examples of the method, apparatuses, and non-transitory computer-readable medium described herein may further include operations, features, means, or instructions for identifying a port RE mask and a port symbol mask for each antenna port of the set of multiple antenna ports based on receiving the control message.

Some examples of the method, apparatuses, and non-transitory computer-readable medium described herein may further include operations, features, means, or instructions for identifying a beam corresponding to each antenna port of the set of multiple antenna ports based on identifying the port RE mask and the port symbol mask for each antenna port.

Some examples of the method, apparatuses, and non-transitory computer-readable medium described herein may further include operations, features, means, or instructions for identifying that the port RE mask indicates one or more REs to be allocated to each antenna port of the set of multiple antenna ports for the reference signal transmission and identifying that the port symbol mask indicates one or more symbol periods to be allocated to each antenna port of the set of multiple antenna ports for the reference signal transmission.

Some examples of the method, apparatuses, and non-transitory computer-readable medium described herein may further include operations, features, means, or instructions for identifying a beam identifier field in the control message indicating an identifier for a beam to be used for each antenna port of the set of multiple antenna ports based on receiving the control message.

Some examples of the method, apparatuses, and non-transitory computer-readable medium described herein may further include operations, features, means, or instructions for identifying whether the control message indicates beam weights based on a value of a first field in a section header of the control message.

Some examples of the method, apparatuses, and non-transitory computer-readable medium described herein may further include operations, features, means, or instructions for identifying a second field indicating beamforming weight in-phase value field and a third field indicating beamforming weight quadrature value based on identifying that the control message indicates beam weights.

In some examples of the method, apparatuses, and non-transitory computer-readable medium described herein, a value of zero for the first field corresponds to the control message indicating beam weights and a value of one for the first field corresponds to the control message not indicating beam weights. In some examples of the method, apparatuses, and non-transitory computer-readable medium described herein, the resource RE mask and the resource symbol mask may be included in a section header of the control message.

In some examples of the method, apparatuses, and non-transitory computer-readable medium described herein, the wireless communications device may be an O-RAN radio unit and the control message may be received from an O-RAN distributed unit. In some examples of the method, apparatuses, and non-transitory computer-readable medium described herein, the reference signal transmission includes at least one of a channel state information reference signal, a positioning reference signal, a control resource set demodulation reference signal, or a combination thereof.

A method for wireless communication at a wireless communications device associated with a base station is described. The method may include receiving a control message including a puncturing RE mask and a symbol mask, the puncturing resource RE mask indicating one or more frequency resources for applying a puncturing pattern and the symbol mask indicating one or more time resources for applying the puncturing pattern during a transmission and performing the transmission in accordance with the puncturing pattern indicated in the control message including the puncturing resource RE mask and a symbol mask.

An apparatus for wireless communication at a wireless communications device associated with a base station is described. The apparatus may include a processor, memory coupled with the processor, and instructions stored in the memory. The instructions may be executable by the processor to cause the apparatus to receive a control message including a puncturing resource RE mask and a symbol mask, the puncturing resource RE mask indicating one or more frequency resources for applying a puncturing pattern and the symbol mask indicating one or more time resources for applying the puncturing pattern during a transmission and perform the transmission in accordance with the puncturing pattern indicated in the control message including the puncturing resource RE mask and a symbol mask.

Another apparatus for wireless communication at a wireless communications device associated with a base station is described. The apparatus may include means for receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission and means for performing the transmission in accordance with the puncturing pattern indicated in the control message including the puncturing resource RE mask and a symbol mask.

A non-transitory computer-readable medium storing code for wireless communication at a wireless communications device associated with a base station is described. The code may include instructions executable by a processor to receive a control message including a puncturing resource RE mask and a symbol mask, the puncturing resource RE mask indicating one or more frequency resources for applying a puncturing pattern and the symbol mask indicating one or more time resources for applying the puncturing pattern during a transmission and perform the transmission in accordance with the puncturing pattern indicated in the control message including the puncturing resource RE mask and a symbol mask.

Some examples of the method, apparatuses, and non-transitory computer-readable medium described herein may further include operations, features, means, or instructions for identifying a number of puncturing patterns based on receiving a field in a section header of the control message. Some examples of the method, apparatuses, and non-transitory computer-readable medium described herein may further include operations, features, means, or instructions for identifying whether the control message indicates a resource block group size and a resource block group mask based on a value of a field of the control message.

Some examples of the method, apparatuses, and non-transitory computer-readable medium described herein may further include operations, features, means, or instructions for identifying that the control message indicates the resource block group size and the resource block group mask in a set of octets based on the value of the field.

Some examples of the method, apparatuses, and non-transitory computer-readable medium described herein may further include operations, features, means, or instructions for identifying that the control message does not indicate the resource block group size and the resource block group mask in a set of octets based on the value of the field. In some examples of the method, apparatuses, and non-transitory computer-readable medium described herein, the value of the field includes zero or one.

Some examples of the method, apparatuses, and non-transitory computer-readable medium described herein may further include operations, features, means, or instructions for determining, based on the control message, that the puncturing pattern applies to a first portion of the transmission and does not apply to a second portion of the transmission, the first portion being associated with a low priority transmission and the second portion being associated with a high priority transmission.

In some examples of the method, apparatuses, and non-transitory computer-readable medium described herein, the low priority transmission includes a physical downlink shared channel transmission and the high priority transmission includes at least one of a channel state information reference signal transmission, a synchronization signal block transmission, a physical downlink control channel transmission, a control resource set demodulation reference signal transmission, a positioning reference signal transmission, or a combination thereof. In some examples of the method, apparatuses, and non-transitory computer-readable medium described herein, the wireless communications device may be an O-RAN radio unit and the control message may be received from an O-RAN distributed unit.

DETAILED DESCRIPTION

Figure 1:
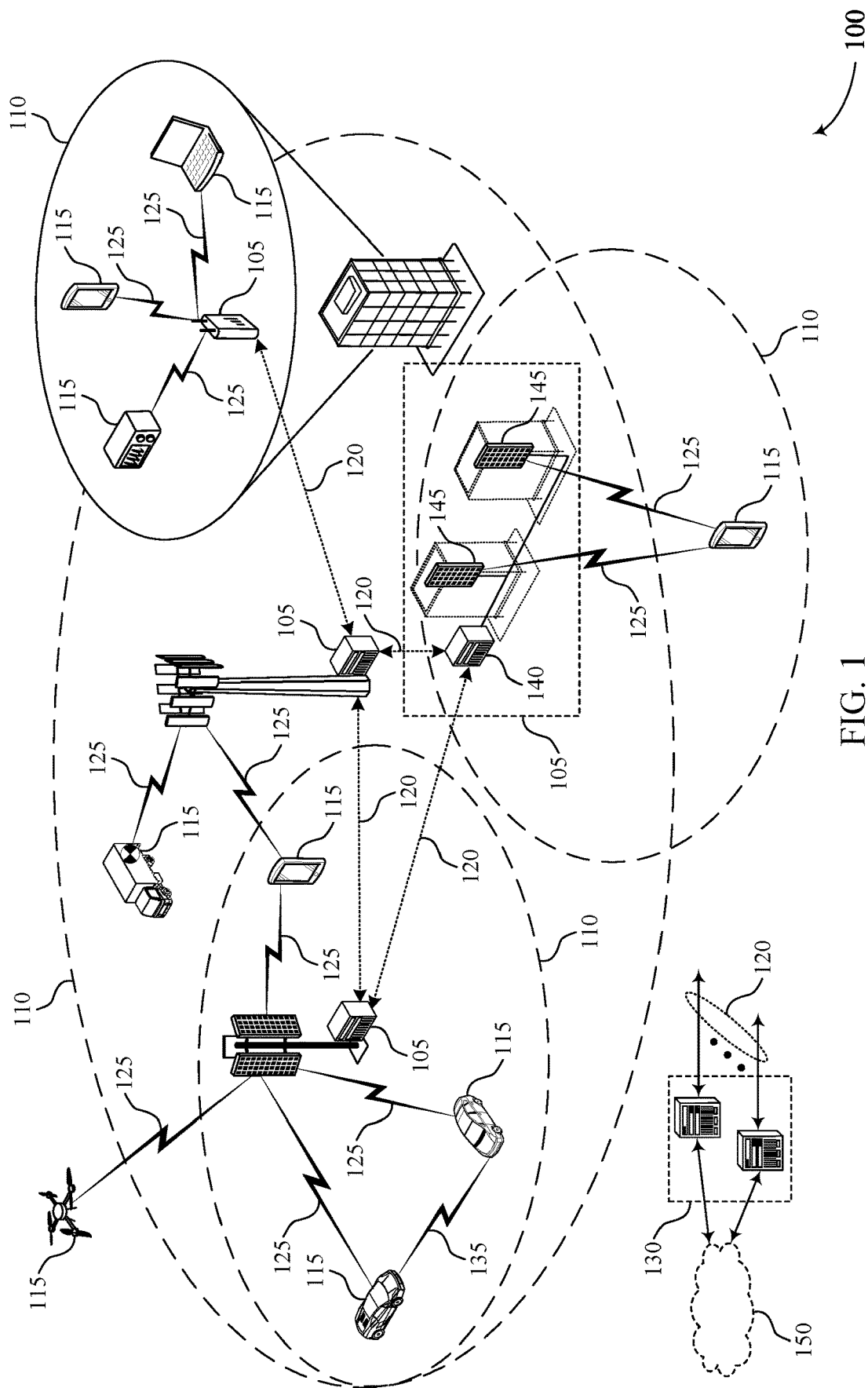
FIG. 1 illustrates an example of a wireless communications system that supports techniques for beam information transmission and punctured channel indication in accordance with aspects of the present disclosure.

To support efficient interoperability between wireless communications devices associated with a multivendor radio access network (RAN), a wireless communications network may operate in accordance with a disaggregated base station hierarchy, such as that specified in an open-RAN (O-RAN) network specification. O-RAN operation may reduce fronthaul transmission bandwidth associated with fifth generation (5G) or New Radio (NR) networks or Long Term Evolution (LTE) networks by supporting functional splitting between the O-RAN distributed unit (O-DU) and the O-RAN radio unit (RU). The O-DU may configure the O-RU using an initial management plane (M-Plane) message and may further communicate with the O-RU using a control plane message. In some examples, the control message may include information related to O-RU operation such as various actions the O-RU may take in order to receive and process incoming data.

Multiple antenna ports are used for reference signal transmission by a base station and each antenna port may transmit using a separate beam. The O-DU may configure the control message such that it includes a section header and a section type. The section header may provide information to the O-RU of how to read the corresponding data in the user plane, including an allocation of resource block groups configured to convey data. In particular, the O-DU may configure the control message to provide a compact method of passing beam information for multiple antenna ports within a single resource block. In addition, the O-DU may configure a control message that separates beam forming information from other sections of a packet such that processing can be reduced and a compact high priority section can be provided to an O-RU.

To reduce the signaling overhead and increase communications efficiency between the O-DU and the O-RU, the O-DU may configure a control message that includes a first mask (resource RE mask) representing a frequency resource indication of a channel state information reference signal resource and a second mask (symbol mask) that represents a time resource indication of the channel state information reference signal resource. Additionally or alternatively, the O-DU may configure a control message to include a first mask (resource RE mask) that represents frequency resource indication of a puncturing pattern and a second mask (symbol mask) that represents symbols in which the puncturing pattern applies.

Particular aspects of the subject matter described herein may be implemented to realize one or more advantages. The described techniques may support improvements in techniques for operations and signaling in an ORAN. In some examples, the techniques may allow for decreased signaling overhead and complexity, in addition to decreased network congestion. In addition, the techniques may decrease processing time and processing complexity for the control message at the O-RU. As such, supported techniques may include improved network operations and, in some examples, may promote increased communications efficiency, among other benefits.

Aspects of the disclosure are initially described in the context of wireless communications systems. Aspects of the disclosure are further illustrated by and described with reference to an ORAN functional split architecture diagram, ORAN signaling configuration diagrams, apparatus diagrams, system diagrams, and flowcharts that relate to techniques for beam information transmission and punctured channel indication.

FIG. 1 illustrates an example of a wireless communications system 100 that supports techniques for beam information transmission and punctured channel indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may include one symbol period (e.g., a duration of one modulation symbol)

and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To support efficient interoperability between wireless communications devices associated with a multivendor RAN, a wireless communications network may operate in accordance with an O-RAN network specification. ORAN operation may reduce fronthaul transmission bandwidth associated with 5G/NR or LTE networks by supporting functional splitting between the O-DU and the O-RU, which may be located at or associated with a base station 105. The O-DU may communicate with the O-RU using a control message which includes a header indicating an allocation of resource block groups configured to convey data.

To reduce receiver and transmitter implementation complexity, the O-DU may transmit a control message including a resource RE mask and a resource symbol mask. The resource RE mask may indicate one or more frequency resources to be allocated for a reference signal transmission across a set of antenna ports and the resource symbol mask may indicate one or more time resources to be allocated for the reference signal transmission. An O-RU may transmit the reference signal in accordance with the control message including the resource RE mask and the resource symbol mask. Additionally or alternatively, the O-DU may transmit a control message including a puncturing resource RE mask and a symbol mask. The puncturing resource RE mask may indicate one or more frequency resources for applying a puncturing pattern and the symbol mask may indicate one or more time resources for applying the puncturing pattern during a transmission. The O-RU may perform the transmission in accordance with the puncturing pattern indicated in the control message including the puncturing resource RE mask and the symbol mask.

Figure 2:
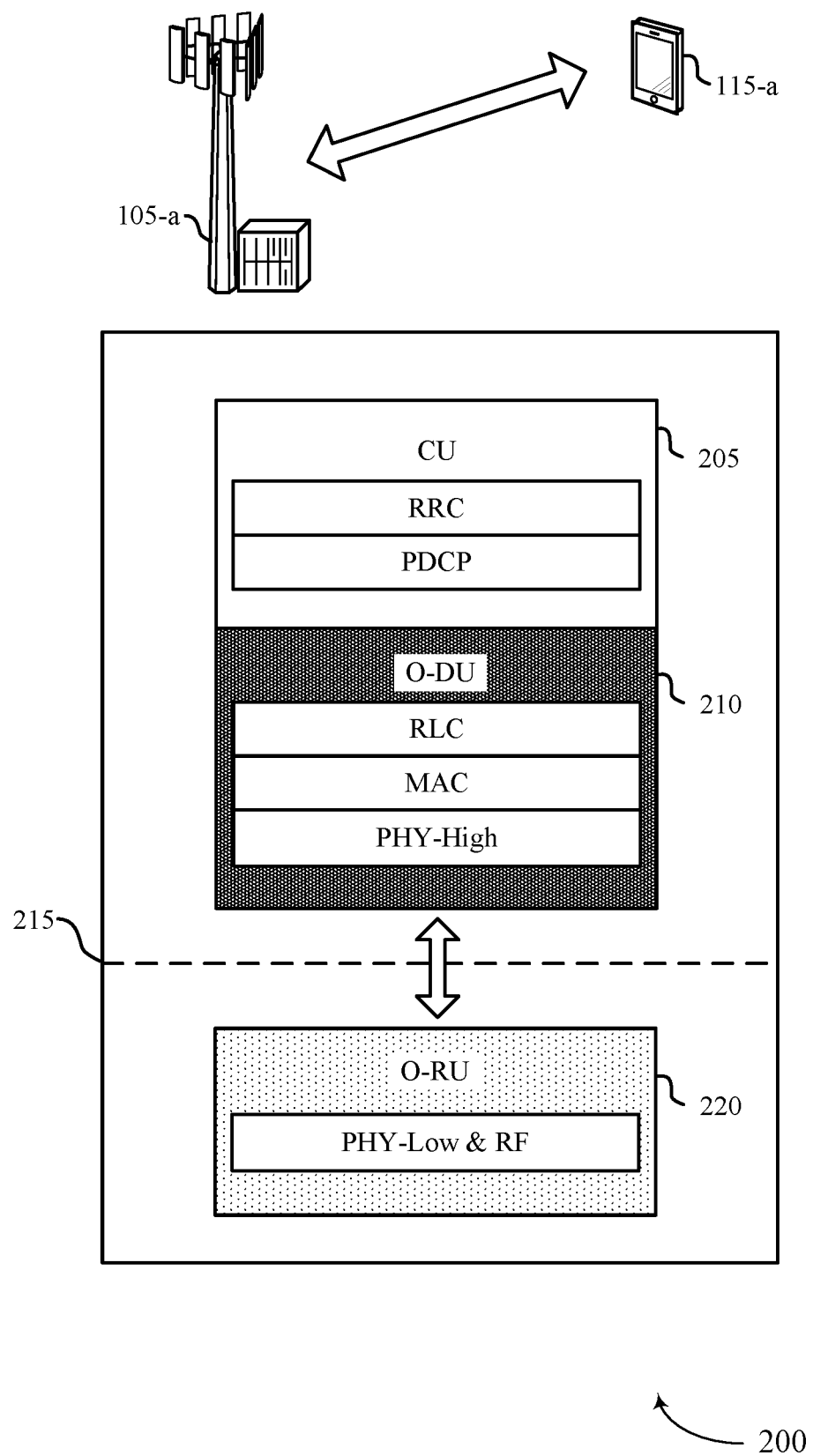
FIG. 2 illustrates an example of an open radio access network (O-RAN) functional split architecture that supports techniques for beam information transmission and punctured channel indication in accordance with aspects of the present disclosure.

FIG. 2 illustrates an example of an O-RAN functional split architecture 200 that supports techniques for beam information transmission and punctured channel indication in accordance with aspects of the present disclosure. For example, the O-RAN functional split architecture 200 may include a base station 105-a in communication with a UE 115-a, which may be examples of base stations 105 and UEs 115 as described with reference to FIG. 1.

Some wireless communications systems may support a centralized radio access network (C-RAN) architecture, which may connect baseband processing by a number of centralized base stations to one or more UEs via a direct link.

In some cases, a common public radio interface (CPRI) used in the C-RAN may not support fronthaul interfaces, and as a result, different regions of the RAN may be specified by different vendors. Such multivendor RAN architecture may reduce interoperability between baseband processing at the base station and UEs in cases where the base station and UE are associated with different vendors.

To support efficient interoperability between wireless communications devices associated with a multivendor RAN, the network may operate in accordance with an O-RAN network specification. O-RAN operation may reduce fronthaul transmission bandwidth associated with 5G/NR or LTE networks by supporting functional splitting that allows for some layer 1 (e.g., physical layer) functions to be reallocated to increase efficiency. The functional split 215 occurs between the O-DU 210 and the O-RU 220, which may be located at the base station 105-a. The O-DU 210 is a logical node containing the radio link control (RLC) and medium access control (MAC) layers in addition to higher physical layers such as the packet data convergence protocol (PDCP) layer. The O-RU 220 is a logical node containing lower physical layers and radio frequency processing based on lower layer function split. In some examples, the functional split 215 of the O-DU 210 and O-RU 220 may occur at the base station 105-a, and the O-DU 210 and O-RU 220 may contain a subset of the functions of the base station. The control and user plane communication with the O-RU 220 may be controlled by the O-DU 210.

In downlink communications and RE mapping processes at the physical layer, the O-RU 220 may perform a number of operations such as OFDM phase compensation, inverse fast Fourier transform (iFFT), cyclic prefix addition, and digital beamforming. Additional physical layer functions may be performed by the O-DU 210, including RE mapping, precoding, layer mapping, modulation, scrambling, rate matching and coding. In the uplink, the O-RU may perform OFDM phase compensation, FFT, cyclic prefix removal and digital beamforming functions reside in the O-RU 220. Additional physical layer functions including RE de-mapping, equalization, de-modulation, de-scrambling, rate de-matching and de-coding may be performed by the O-DU 210.

The functional split between the O-RU 220 and O-DU 210 components may increase interface simplicity. For example, the transfer of user plane data is based on the transmission of REs or physical resource blocks, which simplifies the data mapping and limits the number of associated control messages transmitted from the O-DU 210 to the O-RU 220. In addition, the interface design may support different beamforming techniques (e.g., digital beamforming, analog beamforming) as well as different beamforming algorithms. The functional split may also increase interoperability and reduce O-RU 220 complexity (e.g., fewer functions at O-RU 220).

In O-RAN, the centralized unit (CU) 205 supports a protocol stack (e.g., including RRC and PDCP layers) that includes functions of the base station 105-a including transfer of user data (e.g., data from UE 115-a), mobility control, RAN sharing, session management, and communications with the O-DU 210. In O-RAN, the PHY layer may be divided into two parts (baseband PHY and low PHY for frequency domain to time domain conversion using digital fountain and beamforming that distributes the layers to multiple antennas).

In some examples, O-RAN includes user plane and control plane (messages that describe a technique for beam forming on channels). Aspects depicted herein provide for a compact beam representation. Control plane messaging may include sections, where each section uses one or more resource blocks that provide information about beams to be used by these resource blocks. The sections may provide the identifiers of the beams assuming that the beams are locally stored. Alternatively, the sections may provide the beam weight and the receiver may associate the weights to locations in time and frequency, and can use the beam weight when data samples arrive.

In some examples, the O-DU 210 may transmit a physical downlink shared channel to the O-RU 220, and part of it may overlap with channel state information reference signals. For instance, there may be two types of resource blocks using common time and frequency resources. Without a consolidation method, the control message may describe each type of resource block separately. That is, the O-RU 220 may process a control message describing non-overlapping resource block using a section and overlapping resource blocks using another section. In addition, if there are multiple channel state information reference signals, then the control message may include multiple sections.

In one example, a channel state information reference signal resource may have up to 32 ports, where each port may be associated with a separate beam. In a single layer (eAxC) there may be up to 16 ports per slot for a single channel state information reference signal layer. This means that a single channel state information reference signal resource may create 16 priority sections in a single layer. In some examples, antenna port may be described by separate sections. When using time and frequency coupling with priorities, a single channel state information reference signal resource may thus create 16 high priority sections. When a control-plane packet for a single layer gets fragmented across multiple packets, these high priority sections are repeated in every packet. For instance, if 16 sections are used to describe a single channel state information reference signal resource, then each of the 16 sections are repeated (e.g., where channel state information reference signal is repeated) across different messages. Thus, it is beneficial to have a compact representation for such channels. This will allow for efficient processing at the O-RU 220.

In some examples, where a single channel state information reference signal is a high priority channel and physical downlink shared channel is a lowest priority channel, and there are 4 channel state information reference signal resources in every slot, then it will result in 64 high priority sections. In one example, where the physical downlink shared channel has beam weights with per resource block weights (resource block bundle size=1), the I beam weight coefficient is 16-bit for up to 64 TRX, and Q beam weight coefficient is 16-bit for up to 64 TRX, then this will result in 47, 1500-byte packets for a single control-plane layer. In addition, each of the 47 packets may have 64 highest priority sections. This leads to large processing overhead as well as fronthaul overhead (also increases transmitter and receiver complexity) at the O-RU 220.

Aspects of the present disclosure provide for defining a compact method of transferring beam information (control-Plane) for multiple antenna ports within a single resource block. In addition, aspects of the present disclosure provide for consolidation of puncturing information of a channel into a single O-RAN section. The O-DU 210 may transmit control messages to the O-RU 220 in accordance with the functional split. The control message may contain a header, which contains information such as message type, a payload size, destination identifiers, etc. In some examples, the header may contain information (e.g., in a section header)

which notifies the O-RU 220 of how to interpret the data of the control message in the user plane. The message may further contain radio frame, subframe, slot, or OFDM symbol information of one or more physical resource blocks.

The O-RU 220 may receive the control message, which may notify the O-RU 220 of what action the O-RU 220 may take on incoming data, or what action the O-RU 220 may take on decoded data over the air from the user. In particular, the O-DU 210 may transmit a control message including a resource RE mask and a resource symbol mask to the O-RU 220. The resource RE mask may indicate one or more frequency resources to be allocated for a reference signal transmission across multiple antenna ports and the resource symbol mask may indicate one or more time resources to be allocated for the reference signal transmission. The O-RU 220 may then perform the reference signal transmission in accordance with the control message including the resource RE mask and the resource symbol mask.

Additionally or alternatively, the O-RU 220 may receive a control message including a puncturing resource RE mask and a symbol mask. The puncturing resource RE mask may indicate one or more frequency resources for applying a puncturing pattern and the symbol mask may indicate one or more time resources for applying the puncturing pattern during a transmission. The O-RU 220 may then perform the transmission in accordance with the puncturing pattern indicated in the control message including the puncturing resource RE mask and the symbol mask.

Thus, the techniques depicted herein provide for consolidation of beam information (using resource RE mask and resource symbol mask) and consolidation of puncturing information of a channel into a single O-RAN section (using puncturing resource RE mask and symbol mask). With consolidation of puncturing information of a channel into a single O-RAN section, high priority sections may not be repeated in each O-RAN message. The techniques depicted herein may reduce the complexity of the receiver and transmitter and save fronthaul bandwidth. Additionally or alternatively, the techniques depicted herein may provide for efficient separation of beam forming information from other sections (e.g., high priority sections). In some instances, the control message described herein may provide for decoupling the beam forming information associated with a high priority section and reducing the size of the section, thereby providing a compact high priority section.

Figure 3:
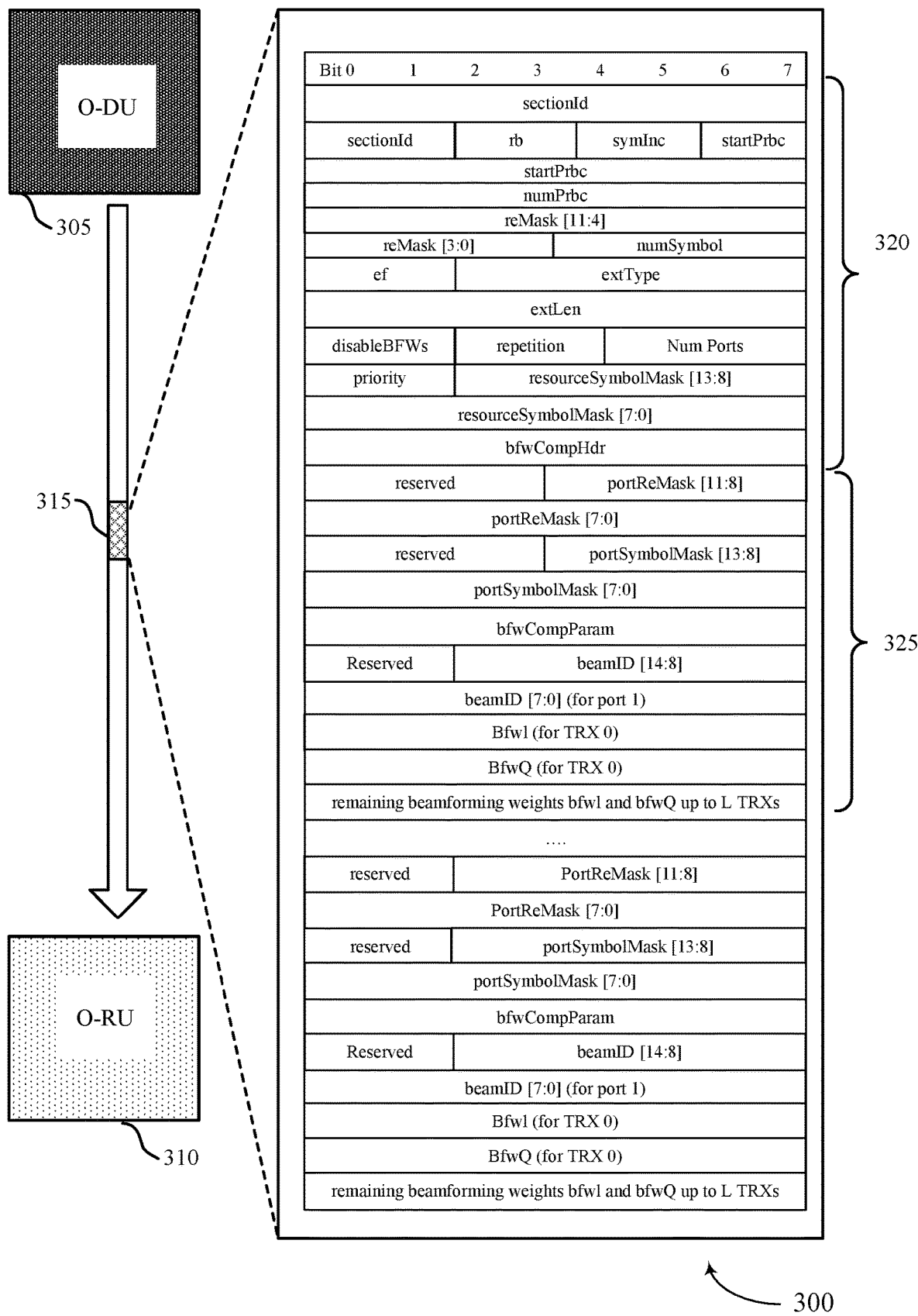
FIG. 3 illustrates an example of an O-RAN signaling configuration that supports techniques for beam information transmission and punctured channel indication in accordance with aspects of the present disclosure.

FIG. 3 illustrates an example of an O-RAN signaling configuration 300 that supports techniques for beam information transmission and punctured channel indication in accordance with aspects of the present disclosure. The O-RAN signaling configuration 300 includes signaling between the base station components O-DU 305 and O-RU 310 (e.g., which may be examples of the corresponding devices described with reference to FIG. 2). Alternative examples of the following signaling structure may be implemented, for example, signaling may occur from the O-DU 305 to the O-RU 310, or from the O-RU 310 to the O-DU 305. In addition, while O-RAN signaling configuration occurs at a base station, it should be understood that these processes may occur between any number of network devices.

Some wireless communications systems support O-RAN architecture including a functional split between the O-DU 305 and the O-RU 310. The O-RAN system described in FIG. 2 may operate in accordance with a resource allocation type. The O-RAN signaling configuration 300 depicts an extension Type (e.g., extension Type-19). The O-RAN system described in FIG. 2 may enable allocation of contiguous or non-contiguous sets of physical resource blocks in both the frequency domain and time domain.

A base station supporting an O-RAN architecture may include O-DU 305 which may communicate with O-RU 310. The O-DU 305 may configure the O-RU 310 using an M-Plane message, and may further control or communicate with the O-RU 310 using a control-plane message 315. In some examples, the control message 315 contains information for operation of the O-RU 310 such as an indication of various actions the O-RU 310 may take in order to receive and process incoming data. In some other examples, the control message 315 may indicate how the O-RU 310 may receive or process decoded data received over the air from the user. In some examples, the communications between the O-DU 305 and the O-RU 310 may be two-way (e.g., uplink or downlink) in accordance with the user plane, which may convey data that data in more than one direction.

The O-DU 305 may configure the control message 315 to transmit data to the O-RU 310. The control message may include a header, including a section header and a section type. The section header may provide information to the O-RU 310 of how to read the corresponding data in the user plane. The O-RAN signaling configuration 300 depicts an extension that describes beams for multiple ports. As shown in FIG. 3, a channel state information reference signal resource may be described in a single section, as opposed to one section per port The control message indicates beams corresponding to each port associated with the time, frequency and bitmask corresponding to the port.

The control message may include a reMask in section header 320 that represents the resource RE mask of a channel state information reference signal resource in any given symbol (combined reMask of individual ports within a symbol). The resourceSymbolMask in the control message represents the symbolMask of the channel state information reference signal resource in its entirety. The O-RU may receive the control message 315 and may determine that the control message includes a resource RE mask (reMask) and a resource symbol mask (resourceSymbolMask). The resource RE mask may indicate one or more frequency resources to be allocated for a reference signal transmission across a set of antenna ports and the resource symbol mask may indicate one or more time resources to be allocated for the reference signal transmission. The reference signal transmission may include at least one of a channel state information reference signal, a positioning reference signal, a control resource set demodulation reference signal, or a combination thereof. The disableBFWs indicates whether the extension shown in FIG. 3 carries beam weight or beam identifiers. The repetition field and priority fields describe if the control message is an original message or a replica. The of field represents an extension field, extType field represents an extension type, and extLen field represents an extension length. The bfwCompHdr indicates to the O-RU 310, a technique to compress indicated beam weights.

The section 325 includes fields specific to channel state information reference signal ports. The field portReMask in the extension in the control message 315 represents the reMask of each antenna port. For example, a single port can also span more than one symbol. In such cases, the field portReMask indicates the symbols including an antenna port. Additionally or alternatively, the field portSymbolMask represents the symbolMask of each antenna port. In some examples, the O-RU 310 may identify a port RE mask (portReMask) and a port symbol mask (portSymbolMask) for each antenna port of the set of antenna ports based on receiving the control message. The O-RU 310 may further identify a beam corresponding to each antenna port of the set of antenna ports based on identifying the port RE mask and the port symbol mask for each antenna port.

As depicted herein, the O-RU 310 may identify that the port RE mask indicates one or more REs to be allocated to each antenna port of the set of antenna ports for the reference signal transmission and that the port symbol mask indicates one or more symbol periods to be allocated to each antenna port of the set of antenna ports for the reference signal transmission. The O-RU 310 may further identify a beam identifier field (beamID) in the control message 315 indicating an identifier for a beam to be used for each antenna port of the set of antenna ports based on receiving the control message 315. In some examples, if the disableBFW field is 0, then the O-RU 310 may determine that beam weight is provided, and if the disableBFW field is 1, then the O-RU 310 may determine that beam weight is not provided. The O-RU 310 may identify whether the control message 315 indicates beam weights based a value of a first field (disableBFW) in a section header 320 of the control message 315. In some aspects, a value of zero for the first field corresponds to the control message indicating beam weights and a value of one for the first field corresponds to the control message not indicating beam weights. In some examples, the O-RU 310 identify a second field indicating beamforming weight in-phase value field (bfwI) and a third field indicating beamforming weight quadrature value (bfwQ) based on identifying that the control message indicates beam weights.

Thus, the O-RAN signaling configuration 300 provides for a one-shot reception of reference signal resource (where receiving logic is simpler at the O-RU 310). This efficiency is pronounced when dealing with fragmentation of control-plane packets (up to 85 packets per layer) and the techniques depicted herein addresses multiple beams within the same resource block. Thus, the O-RAN signaling configuration 300 reduces the number of high priority sections and the processing for overlapping reMask handling (by combining port specification in one section and making it compact).

Figure 4:
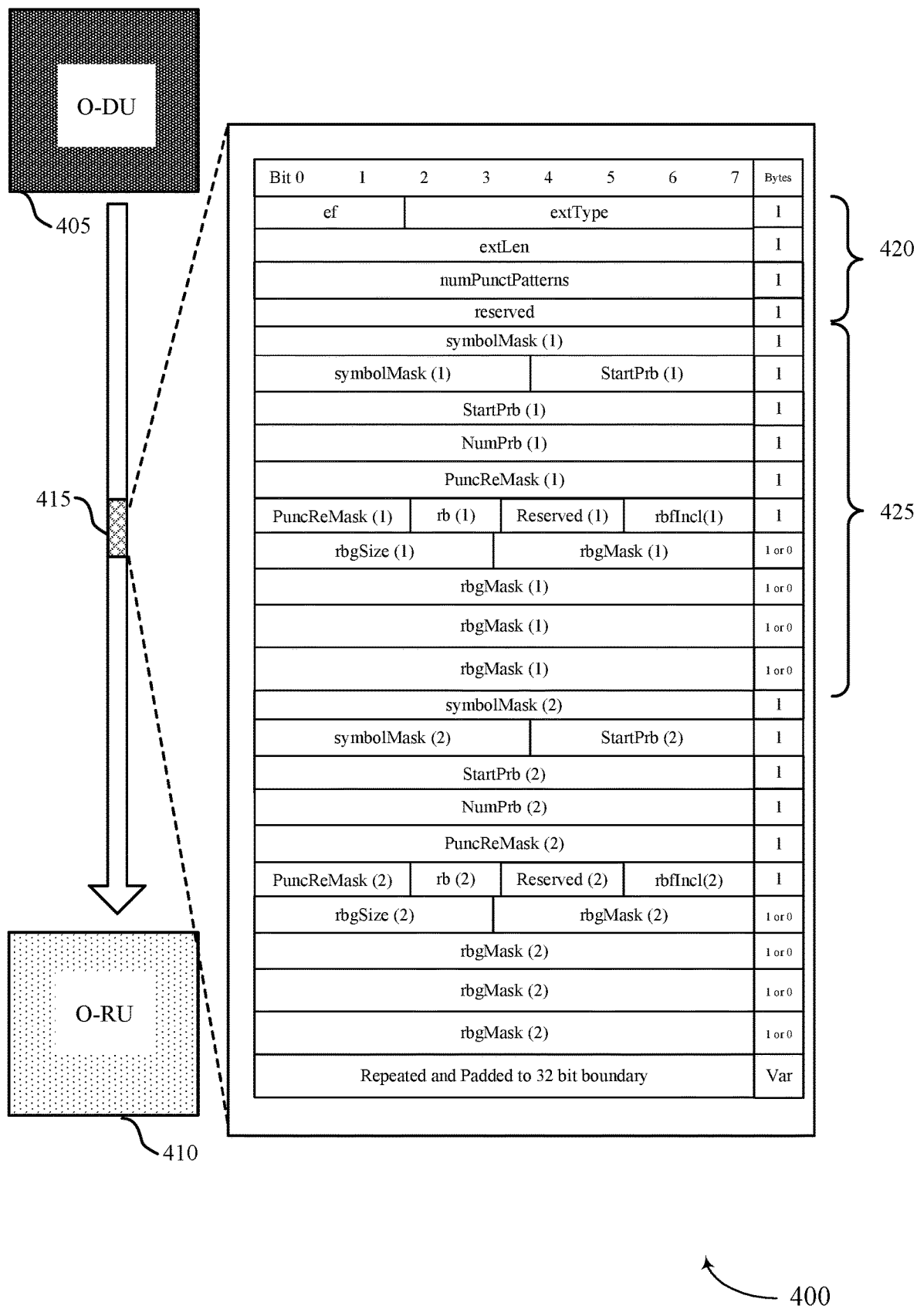
FIG. 4 illustrates an example of an O-RAN signaling configuration that supports techniques for beam information transmission and punctured channel indication in accordance with aspects of the present disclosure.

FIG. 4 illustrates an example of an O-RAN signaling configuration 400 that supports techniques for beam information transmission and punctured channel indication in accordance with aspects of the present disclosure. The O-RAN signaling configuration 400 includes signaling between the base station components O-DU 405 and O-RU 410 (e.g., which may be examples of the corresponding devices described with reference to FIG. 2). Alternative examples of the following signaling structure may be implemented, for example, signaling may occur from the O-DU 405 to the O-RU 410, or from the O-RU 410 to the O-DU 405. In addition, while O-RAN signaling configuration occurs at a base station, it should be understood that these processes may occur between any number of network devices.

Some wireless communications systems support O-RAN architecture including a functional split between the O-DU 405 and the O-RU 410. The O-RAN system described in FIG. 2 may operate in accordance with a resource allocation type. The O-RAN signaling configuration 400 depicts an extension Type (e.g., extension Type-20). The O-RAN system described in FIG. 2 may enable allocation of contiguous or non-contiguous sets of physical resource blocks in both the frequency domain and time domain.

A base station supporting an O-RAN architecture may include O-DU 405 which may communicate with O-RU 410. The O-DU 405 may configure the O-RU 410 using an initial M-Plane message, and may further control or communicate with the O-RU 410 using a control plane message 415. In some examples, the control message 415 may include information for operation of the O-RU 410 such as an indication of various actions the O-RU 410 may take in order to receive and process incoming data. In some examples, the communications between the O-DU 405 and the O-RU 410 may be two-way (e.g., uplink or downlink) in accordance with the user plane, which may convey data that data in more than one direction.

The O-DU 405 may configure the control message 415 to transmit data to the O-RU 410. The control message 415 may include a header, including a section header and a section type. The O-RAN signaling configuration 400 depicts an extension that describes a dedicated puncturing section. Control plane packets may include high priority sections and low priority sections like time and frequency coupling with priorities. In addition, puncturing sections as depicted herein, may carry consolidated representation of the reMasks and symMasks corresponding to the high priority sections. A puncturing section may not carry any beamforming information and may be compact. Additionally or alternatively, a puncturing section may provide puncturing masks to remove bits from the reMask of low priority sections and may not apply to the high priority sections. When control plane is fragmented, high priority sections may not be repeated, and instead, the puncturing section may be repeated. In particular, a top-level puncturing section may be included with each packet for overlap handling.

As shown in FIG. 4, the control message 415 may include a puncturing section. In particular, the puncturing section may be intended for puncturing purposes. In some examples, a packet may include puncturing sections, high priority sections and low priority sections. In some examples, low priority sections may puncture their reMask pattern based on the reMask pattern indicated in FIG. 3.

The control message may include a puncReMask in section 425 that represents a reMask of a puncturing pattern. The field symbolMask in the control message represents the symbols in which the puncturing pattern applies. The O-RU may receive the control message 315 and may determine that the control message includes a puncturing resource RE mask (puncReMask) and a symbol mask (symbolMask). The puncturing resource RE mask may indicate one or more frequency resources for applying a puncturing pattern and the symbol mask may indicate one or more time resources for applying the puncturing pattern during a transmission. The section header 420 of the control message 415 may include the field numPunctPatterns indicating a number of puncturing patterns. The O-RU 410 may receive the control message 415 and may identify a number of puncturing patterns based on receiving a field (numPunctPatterns) in a section header 420 of the control message 415. In some examples, the O-RU 410 may determine that the puncturing pattern applies to a first portion of the transmission and does not apply to a second portion of the transmission. The first portion may be associated with a low priority transmission and the second portion may be associated with a high priority transmission. In some examples, the low priority transmission may include a physical downlink shared channel transmission and the high priority transmission may include at least one of a channel state information reference signal transmission, a synchronization signal block transmission, a physical downlink control channel transmission, a control resource set demodulation reference signal transmission, a positioning reference signal transmission, or a combination thereof. The fields StartPrb, NumPrb and rb may identify the resource blocks range of the puncturing pattern.

The O-RU 410 may identify whether the control message indicates a resource block group size and a resource block group mask based on a value of a field of the control message. If the field rbgIncl is set to 1, then the O-RU 410 may determine that the next 4 octets specify the resource block group size (rbgSize) and the resource block group mask (rbgMask) of the puncturing pattern. If the field rbgIncl is set to 0, then the O-RU 410 may determine that the resource block group size (rbgSize) and the resource block group mask (rbgMask) fields are not present. For instance, the O-RU 410 may identify that the control message indicates the resource block group size and the resource block group mask in a set of octets based on a value of a field of the control message 415. Alternatively, the O-RU 410 may identify that the control message does not indicate the resource block group size and the resource block group mask in a set of octets based on the value of the field.

Thus, the O-RAN signaling configuration 400 provides for a technique to consolidate puncturing information of a channel into a single O-RAN section. With the extension described with reference to FIG. 4, high priority sections may not be repeated with each O-RAN message. The techniques depicted herein may thus reduce the complexity of the receiver and transmitter and save fronthaul bandwidth.

Figure 5:
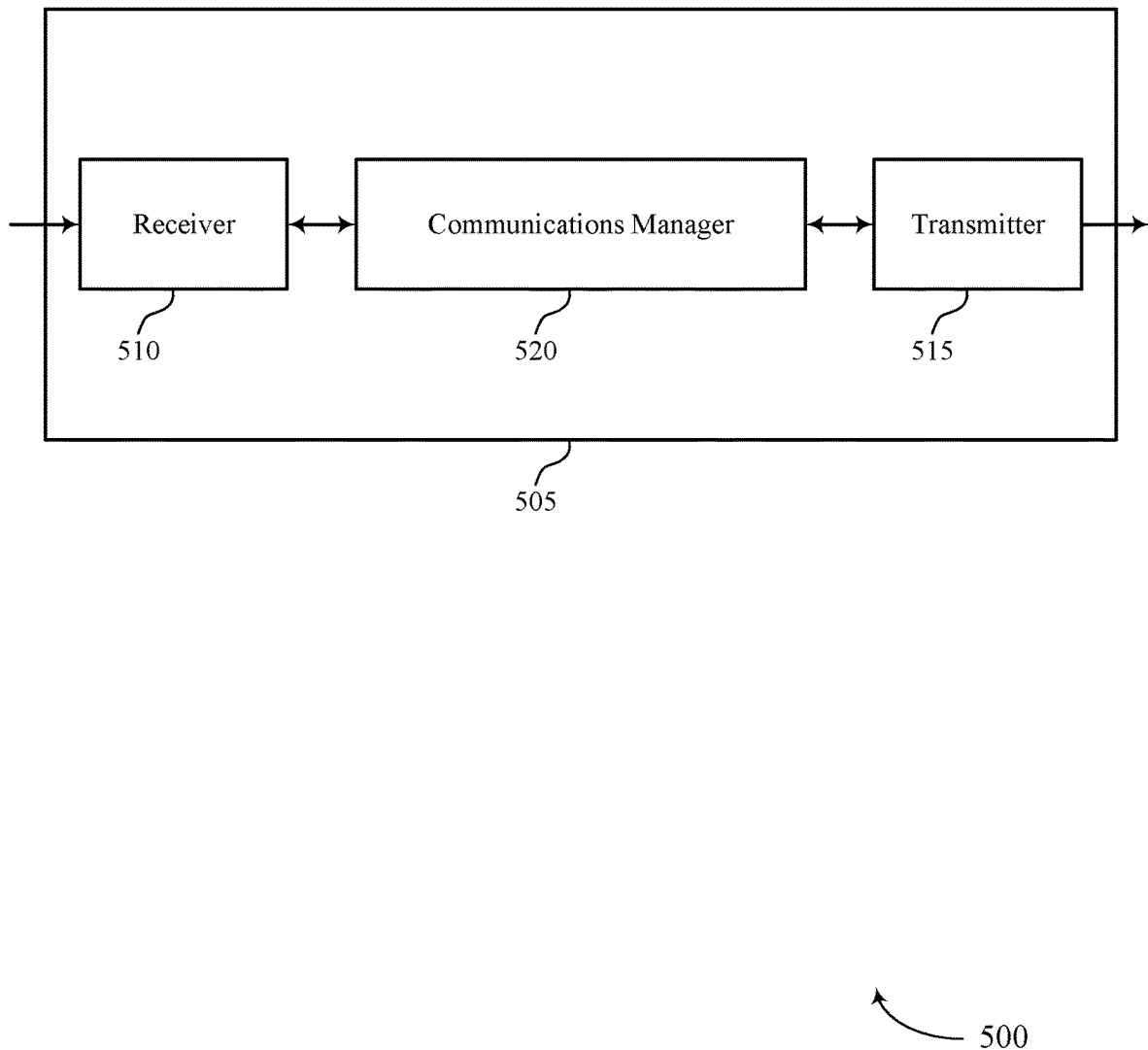
FIGS. 5 and 6 show block diagrams of devices that support techniques for beam information transmission and punctured channel indication in accordance with aspects of the present disclosure.

FIG. 5 shows a block diagram 500 of a device 505 that supports techniques for beam information transmission and punctured channel indication in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam information transmission and punctured channel indication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam information transmission and punctured channel indication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for beam information transmission and punctured channel indication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a wireless communications device associated with a base station in accordance with examples as disclosed herein. For example, the communications manager 520 may be configured as or otherwise support a means for receiving a control message including an resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission. The communications manager 520 may be configured as or otherwise support a means for performing the reference signal transmission in accordance with the control message including the resource RE mask and the resource symbol mask.

Additionally or alternatively, the communications manager 520 may support wireless communication at a wireless communications device associated with a base station in accordance with examples as disclosed herein. For example, the communications manager 520 may be configured as or otherwise support a means for receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission. The communications manager 520 may be configured as or otherwise support a means for performing the transmission in accordance with the puncturing pattern indicated in the control message including the puncturing resource RE mask and the symbol mask.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources.

Figure 6:
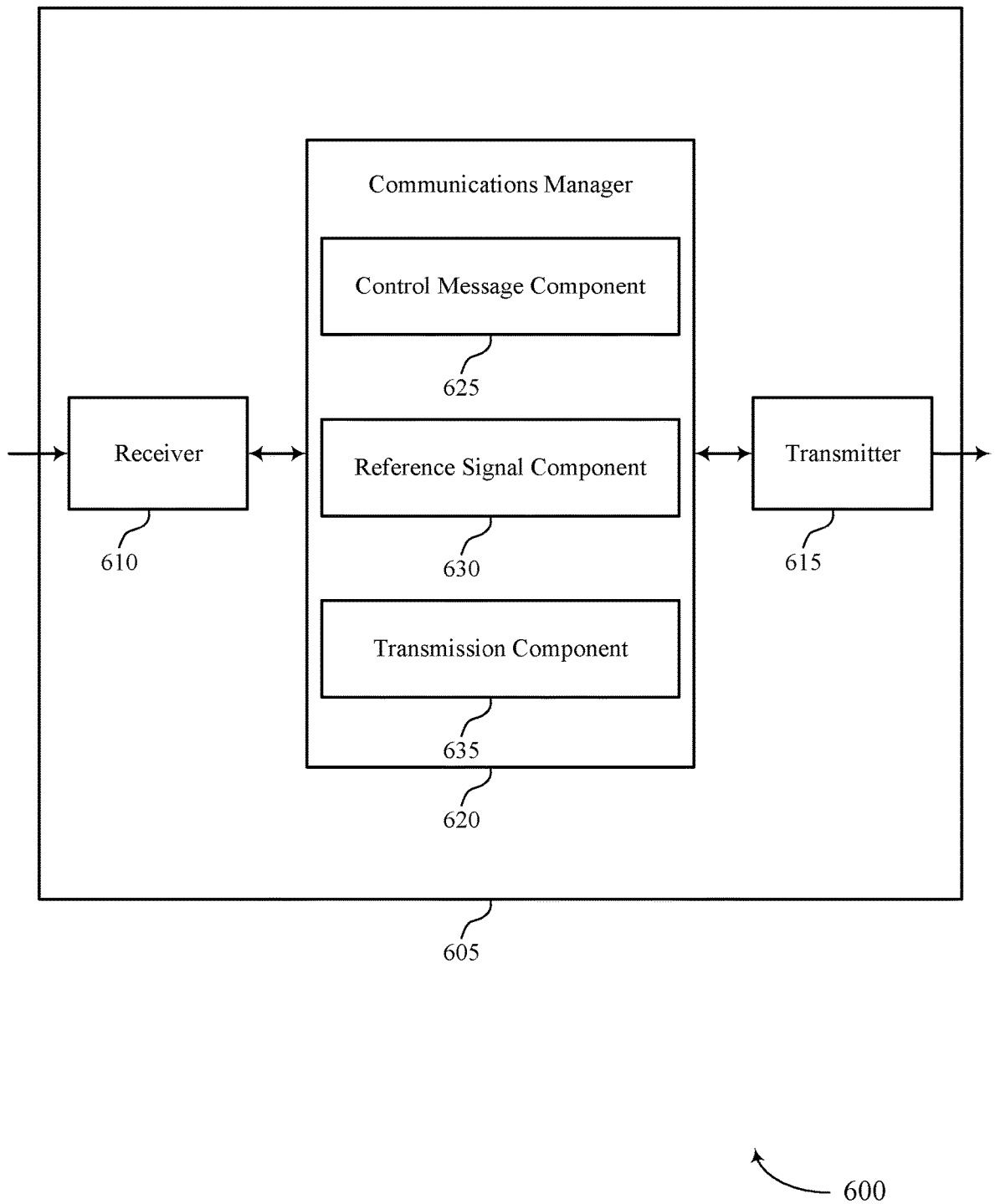

FIG. 6 shows a block diagram 600 of a device 605 that supports techniques for beam information transmission and punctured channel indication in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam information transmission and punctured channel indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam information transmission and punctured channel indication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for beam information transmission and punctured channel indication as described herein. For example, the communications manager 620 may include a control message component 625, a reference signal component 630, a transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a wireless communications device associated with a base station in accordance with examples as disclosed herein. The control message component 625 may be configured as or otherwise support a means for receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission. The reference signal component 630 may be configured as or otherwise support a means for performing the reference signal transmission in accordance with the control message including the resource RE mask and the resource symbol mask.

Additionally or alternatively, the communications manager 620 may support wireless communication at a wireless communications device associated with a base station in accordance with examples as disclosed herein. The control message component 625 may be configured as or otherwise support a means for receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission. The transmission component 635 may be configured as or otherwise support a means for performing the transmission in accordance with the puncturing pattern indicated in the control message including the puncturing resource RE mask and the symbol mask.

Figure 7:
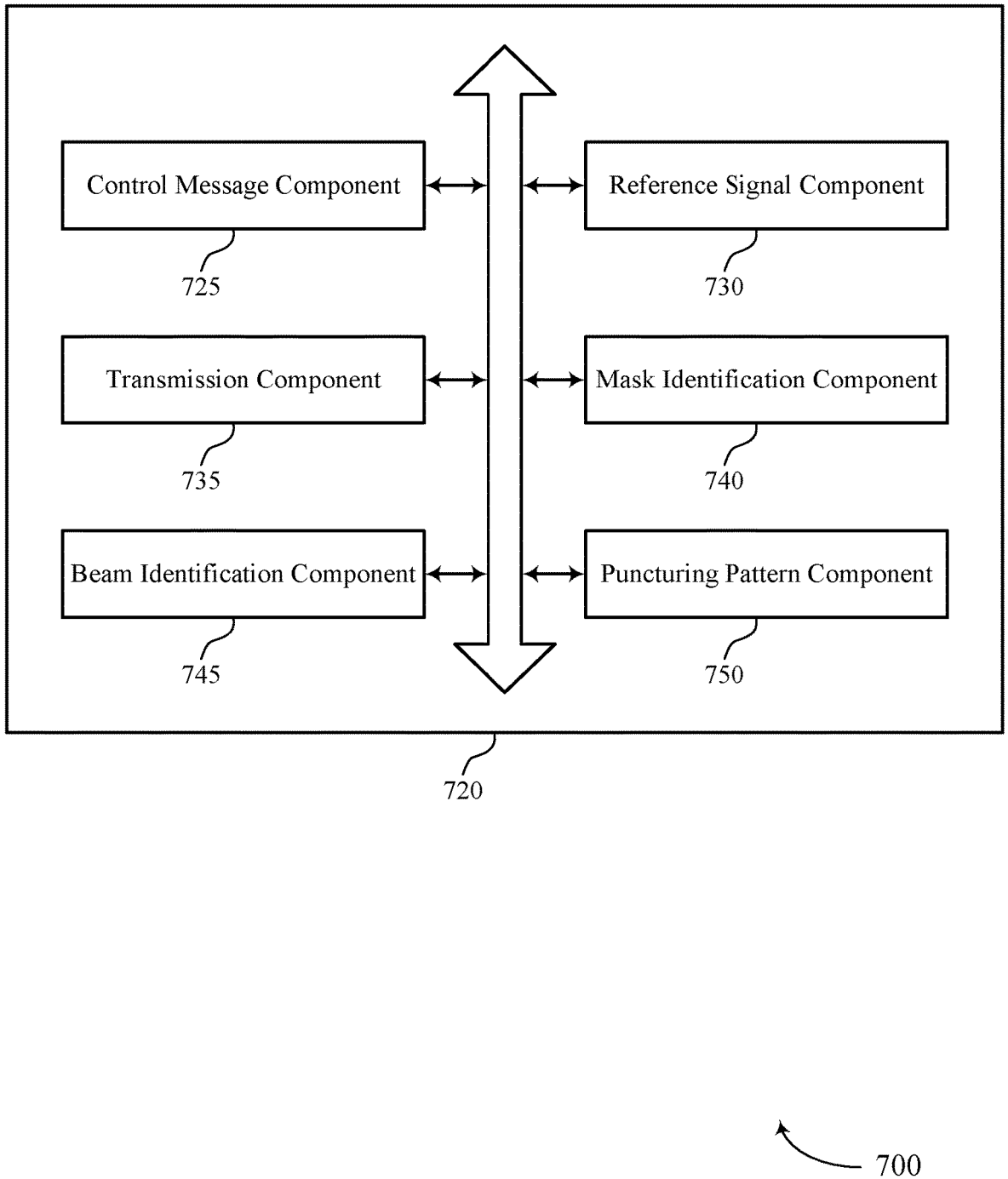
FIG. 7 shows a block diagram of a communications manager that supports techniques for beam information transmission and punctured channel indication in accordance with aspects of the present disclosure.

FIG. 7 shows a block diagram 700 of a communications manager 720 that supports techniques for beam information transmission and punctured channel indication in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for beam information transmission and punctured channel indication as described herein. For example, the communications manager 720 may include a control message component 725, a reference signal component 730, a transmission component 735, a mask identification component 740, a beam identification component 745, a puncturing pattern component 750, or any combination thereof. Each of these components may communicate, directly or indirectly, with one another (e.g., via one or more buses).

The communications manager 720 may support wireless communication at a wireless communications device associated with a base station in accordance with examples as disclosed herein. The control message component 725 may be configured as or otherwise support a means for receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission. The reference signal component 730 may be configured as or otherwise support a means for performing the reference signal transmission in accordance with the control message including the resource RE mask and the resource symbol mask.

In some examples, the mask identification component 740 may be configured as or otherwise support a means for identifying a port RE mask and a port symbol mask for each antenna port of the set of multiple antenna ports based on receiving the control message. In some examples, the beam identification component 745 may be configured as or otherwise support a means for identifying a beam corresponding to each antenna port of the set of multiple antenna ports based on identifying the port RE mask and the port symbol mask for each antenna port.

In some examples, the mask identification component 740 may be configured as or otherwise support a means for identifying that the port RE mask indicates one or more REs to be allocated to each antenna port of the set of multiple antenna ports for the reference signal transmission. In some examples, the mask identification component 740 may be configured as or otherwise support a means for identifying that the port symbol mask indicates one or more symbol periods to be allocated to each antenna port of the set of multiple antenna ports for the reference signal transmission.

In some examples, the beam identification component 745 may be configured as or otherwise support a means for identifying a beam identifier field in the control message indicating an identifier for a beam to be used for each antenna port of the set of multiple antenna ports based on receiving the control message. In some examples, the beam identification component 745 may be configured as or otherwise support a means for identifying whether the control message indicates beam weights based on a value of a first field in a section header of the control message.

In some examples, the beam identification component 745 may be configured as or otherwise support a means for identifying a second field indicating beamforming weight in-phase value field and a third field indicating beamforming weight quadrature value based on identifying that the control message indicates beam weights.

In some examples, a value of zero for the first field corresponds to the control message indicating beam weights and a value of one for the first field corresponds to the control message not indicating beam weights. In some examples, the resource RE mask and the resource symbol mask are included in a section header of the control message. In some examples, the wireless communications device is an O-RAN RU and the control message is received from an O-RAN DU.

In some examples, the reference signal transmission includes at least one of a channel state information reference signal, a positioning reference signal, a control resource set demodulation reference signal, or a combination thereof.

Additionally or alternatively, the communications manager 720 may support wireless communication at a wireless communications device associated with a base station in accordance with examples as disclosed herein. In some examples, the control message component 725 may be configured as or otherwise support a means for receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission. The transmission component 735 may be configured as or otherwise support a means for performing the transmission in accordance with the puncturing pattern indicated in the control message including the puncturing resource RE mask and the symbol mask.

In some examples, the puncturing pattern component 750 may be configured as or otherwise support a means for identifying a number of puncturing patterns based on receiving a field in a section header of the control message. In some examples, the control message component 725 may be configured as or otherwise support a means for identifying whether the control message indicates a resource block group size and a resource block group mask based on a value of a field of the control message.

In some examples, the control message component 725 may be configured as or otherwise support a means for identifying that the control message indicates the resource block group size and the resource block group mask in a set of octets based on the value of the field.

In some examples, the control message component 725 may be configured as or otherwise support a means for identifying that the control message does not indicate the resource block group size and the resource block group mask in a set of octets based on the value of the field. In some examples, the value of the field includes zero or one.

In some examples, the puncturing pattern component 750 may be configured as or otherwise support a means for determining, based on the control message, that the puncturing pattern applies to a first portion of the transmission and does not apply to a second portion of the transmission, the first portion being associated with a low priority transmission and the second portion being associated with a high priority transmission.

In some examples, the low priority transmission includes a physical downlink shared channel transmission and the high priority transmission includes at least one of a channel state information reference signal transmission, a synchronization signal block transmission, a physical downlink control channel transmission, a control resource set demodulation reference signal transmission, a positioning reference signal transmission, or a combination thereof. In some examples, the wireless communications device is an O-RAN RU and the control message is received from an O-RAN DU.

Figure 8:
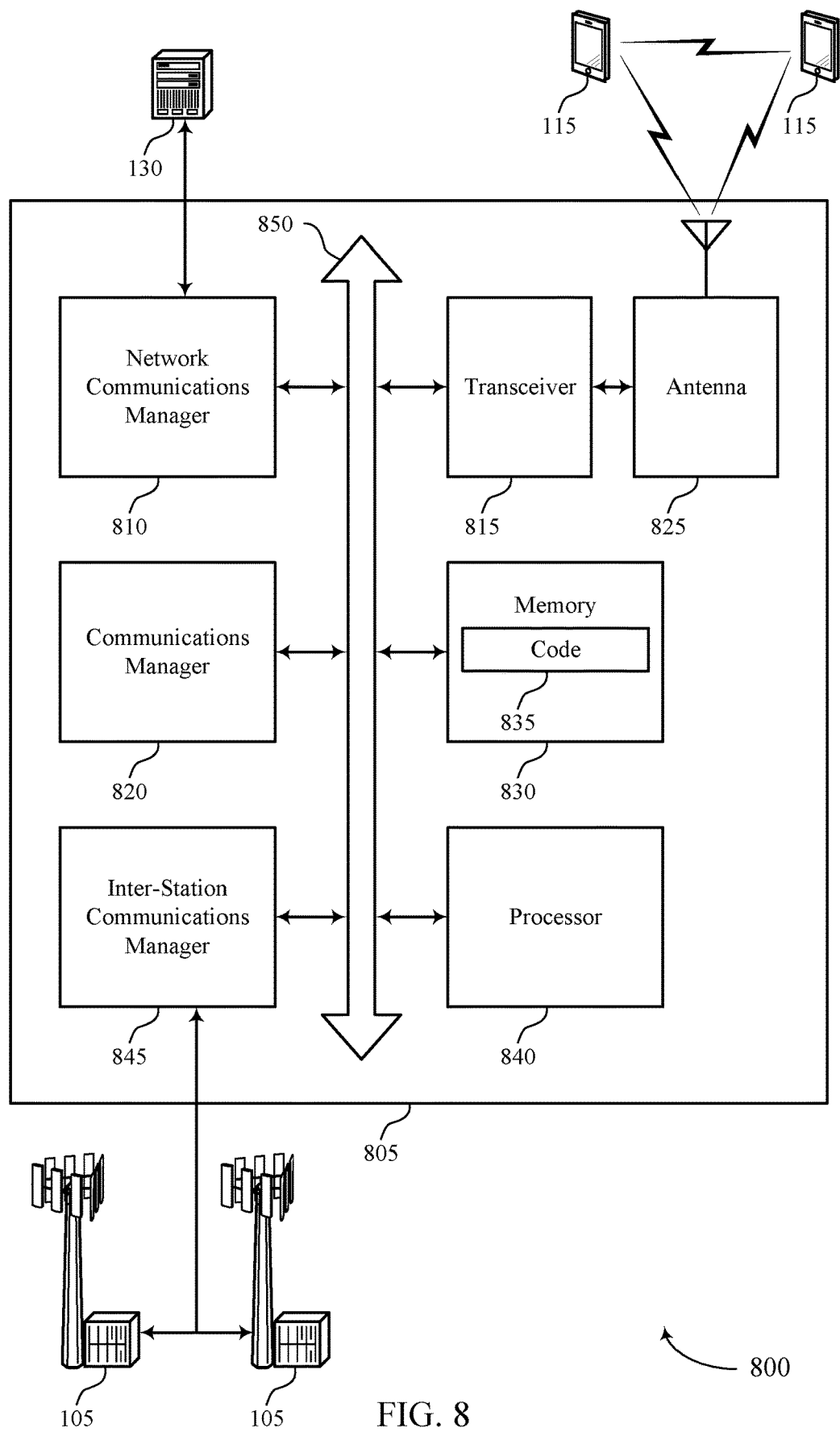
FIG. 8 shows a diagram of a system including a device that supports techniques for beam information transmission and punctured channel indication in accordance with aspects of the present disclosure.

FIG. 8 shows a diagram of a system 800 including a device 805 that supports techniques for beam information transmission and punctured channel indication in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825.

The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for beam information transmission and punctured channel indication). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a wireless communications device associated with a base station in accordance with examples as disclosed herein. For example, the communications manager 820 may be configured as or otherwise support a means for receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission. The communications manager 820 may be configured as or otherwise support a means for performing the reference signal transmission in accordance with the control message including the resource RE mask and the resource symbol mask.

Additionally or alternatively, the communications manager 820 may support wireless communication at a wireless communications device associated with a base station in accordance with examples as disclosed herein. For example, the communications manager 820 may be configured as or otherwise support a means for receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission. The communications manager 820 may be configured as or otherwise support a means for performing the transmission in accordance with the puncturing pattern indicated in the control message including the puncturing resource RE mask and the symbol mask.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for beam information transmission and punctured channel indication as described herein, or the processor 840 and the memory 830 may be otherwise configured to perform or support such operations.

Figure 9:
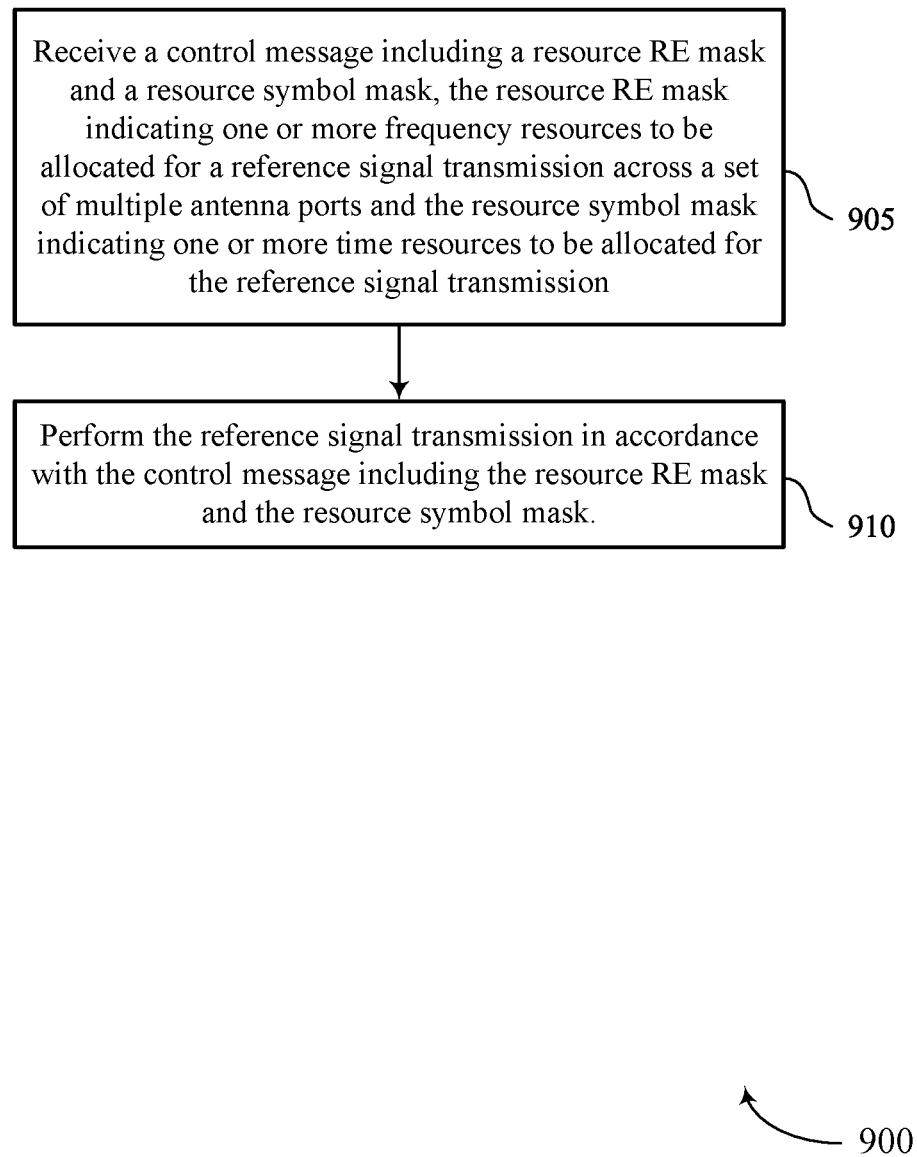
FIGS. 9 through 12 show flowcharts illustrating methods that support techniques for beam information transmission and punctured channel indication in accordance with aspects of the present disclosure.

FIG. 9 shows a flowchart illustrating a method 900 that supports techniques for beam information transmission and punctured channel indication in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 905, the method may include receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission. The operations of 905 may be performed in accordance with examples as disclosed herein. In some examples, aspects of the operations of 905 may be performed by a control message component 725 as described with reference to FIG. 7.

At 910, the method may include performing the reference signal transmission in accordance with the control message including the resource RE mask and the resource symbol mask. The operations of 910 may be performed in accordance with examples as disclosed herein. In some examples, aspects of the operations of 910 may be performed by a reference signal component 730 as described with reference to FIG. 7.

Figure 10:
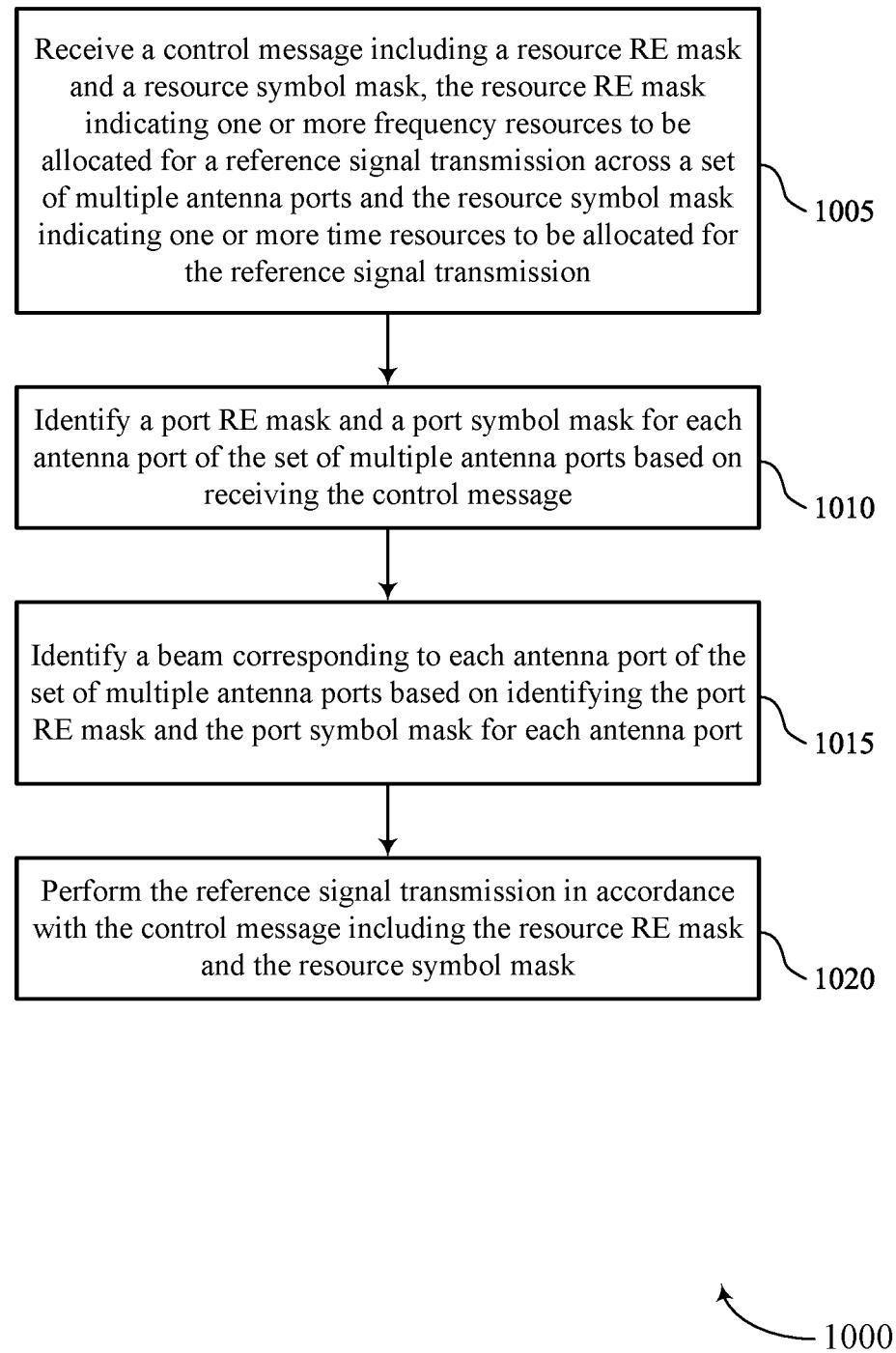

FIG. 10 shows a flowchart illustrating a method 1000 that supports techniques for beam information transmission and punctured channel indication in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include receiving a control message including a resource RE mask and a resource symbol mask, the resource RE mask indicating one or more frequency resources to be allocated for a reference signal transmission across a set of multiple antenna ports and the resource symbol mask indicating one or more time resources to be allocated for the reference signal transmission. The operations of 1005 may be performed in accordance with examples as disclosed herein. In some examples, aspects of the operations of 1005 may be performed by a control message component 725 as described with reference to FIG. 7.

At 1010, the method may include identifying a port RE mask and a port symbol mask for each antenna port of the set of multiple antenna ports based on receiving the control message. The operations of 1010 may be performed in accordance with examples as disclosed herein. In some examples, aspects of the operations of 1010 may be performed by a mask identification component 740 as described with reference to FIG. 7.

At 1015, the method may include identifying a beam corresponding to each antenna port of the set of multiple antenna ports based on identifying the port RE mask and the port symbol mask for each antenna port. The operations of 1015 may be performed in accordance with examples as disclosed herein. In some examples, aspects of the operations of 1015 may be performed by a beam identification component 745 as described with reference to FIG. 7.

At 1020, the method may include performing the reference signal transmission in accordance with the control message including the resource RE mask and the resource symbol mask. The operations of 1020 may be performed in accordance with examples as disclosed herein. In some examples, aspects of the operations of 1020 may be performed by a reference signal component 730 as described with reference to FIG. 7.

Figure 11:
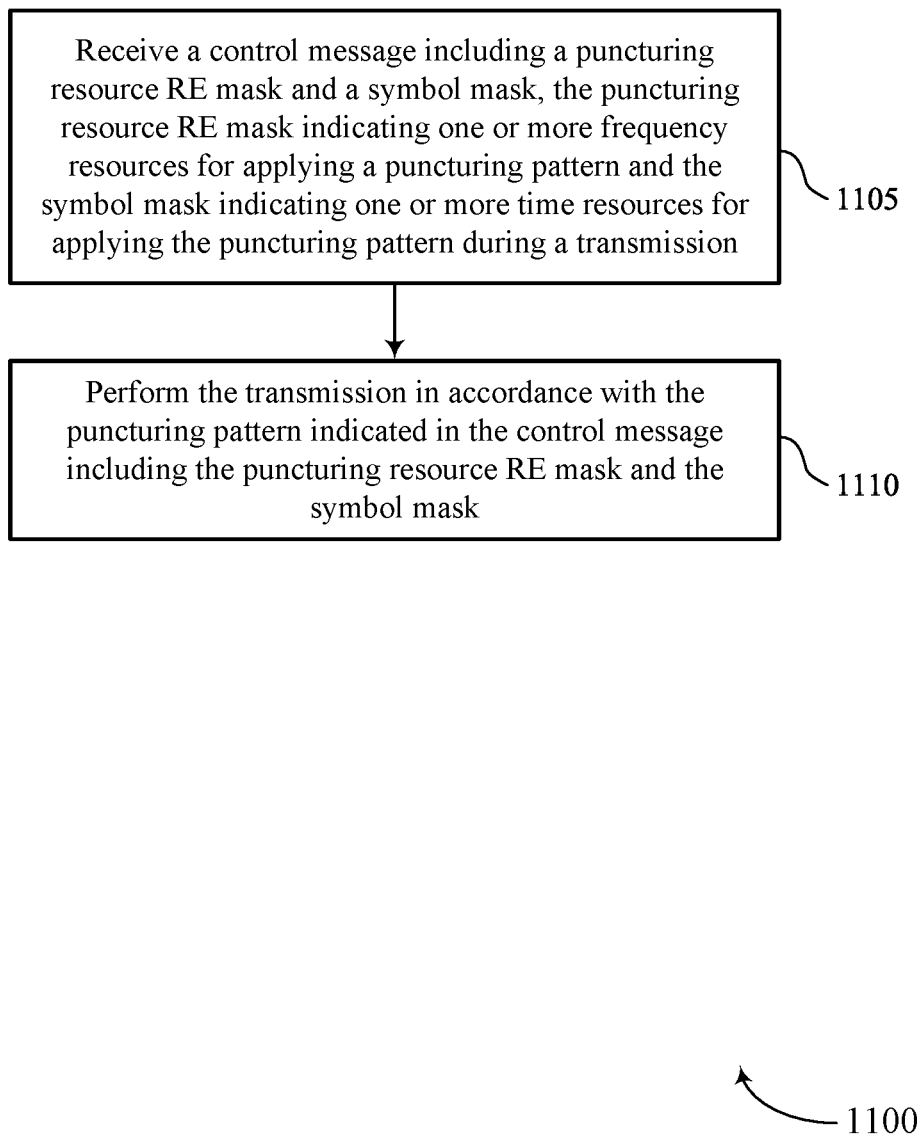

FIG. 11 shows a flowchart illustrating a method 1100 that supports techniques for beam information transmission and punctured channel indication in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1105, the method may include receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission. The operations of 1105 may be performed in accordance with examples as disclosed herein. In some examples, aspects of the operations of 1105 may be performed by a control message component 725 as described with reference to FIG. 7.

At 1110, the method may include performing the transmission in accordance with the puncturing pattern indicated in the control message including the puncturing resource RE mask and the symbol mask. The operations of 1110 may be performed in accordance with examples as disclosed herein. In some examples, aspects of the operations of 1110 may be performed by a transmission component 735 as described with reference to FIG. 7.

Figure 12:
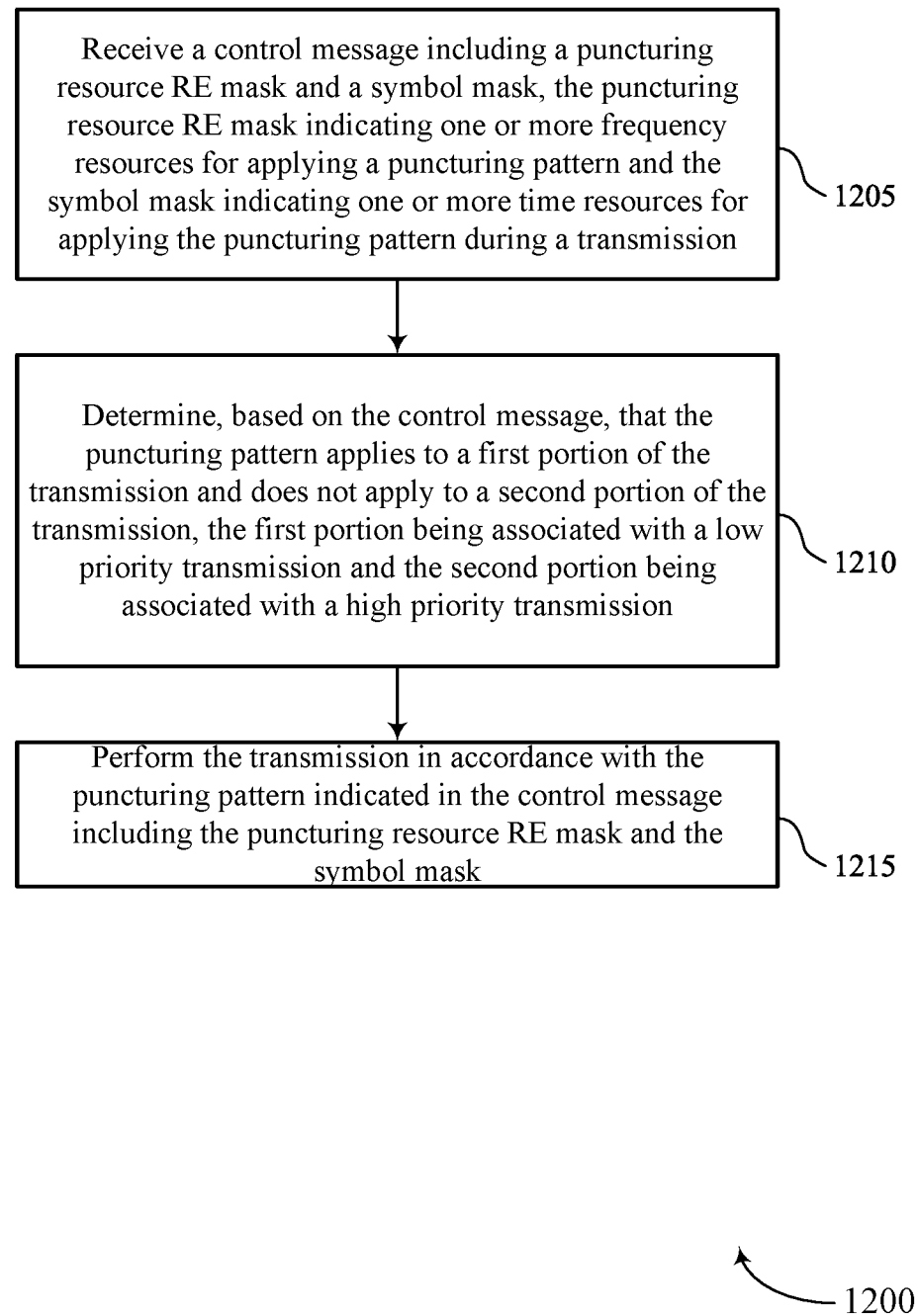

FIG. 12 shows a flowchart illustrating a method 1200 that supports techniques for beam information transmission and punctured channel indication in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1205, the method may include receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission. The operations of 1205 may be performed in accordance with examples as disclosed herein. In some examples, aspects of the operations of 1205 may be performed by a control message component 725 as described with reference to FIG. 7.

At 1210, the method may include determining, based on the control message, that the puncturing pattern applies to a first portion of the transmission and does not apply to a second portion of the transmission, the first portion being associated with a low priority transmission and the second portion being associated with a high priority transmission. The operations of 1210 may be performed in accordance with examples as disclosed herein. In some examples, aspects of the operations of 1210 may be performed by a puncturing pattern component 750 as described with reference to FIG. 7.

At 1215, the method may include performing the transmission in accordance with the puncturing pattern indicated in the control message including the puncturing resource RE mask and the symbol mask. The operations of 1215 may be performed in accordance with examples as disclosed herein. In some examples, aspects of the operations of 1215 may be performed by a transmission component 735 as described with reference to FIG. 7.

The following provides an overview of aspects of the present disclosure:

Aspect 1: A method for wireless communication at a wireless communications device associated with a base station, comprising: receiving a control message including a resource RE mask and a resource symbol mask, the resource RE mask indicating one or more frequency resources to be allocated for a reference signal transmission across a plurality of antenna ports and the resource symbol mask indicating one or more time resources to be allocated for the reference signal transmission; and performing the reference signal transmission in accordance with the control message including the resource RE mask and the resource symbol mask.

Aspect 2: The method of aspect 1, further comprising: identifying a port RE mask and a port symbol mask for each antenna port of the plurality of antenna ports based at least in part on receiving the control message.

Aspect 3: The method of aspect 2, further comprising: identifying a beam corresponding to each antenna port of the plurality of antenna ports based at least in part on identifying the port RE mask and the port symbol mask for each antenna port.

Aspect 4: The method of any of aspects 2 through 3, further comprising: identifying that the port RE mask indicates one or more REs to be allocated to each antenna port of the plurality of antenna ports for the reference signal transmission; and identifying that the port symbol mask indicates one or more symbol periods to be allocated to each antenna port of the plurality of antenna ports for the reference signal transmission.

Aspect 5: The method of any of aspects 1 through 4, further comprising: identifying a beam identifier field in the control message indicating an identifier for a beam to be used for each antenna port of the plurality of antenna ports based at least in part on receiving the control message.

Aspect 6: The method of any of aspects 1 through 5, further comprising: identifying whether the control message indicates beam weights based at least in part on a value of a first field in a section header of the control message.

Aspect 7: The method of aspect 6, further comprising: identifying a second field indicating beamforming weight in-phase value field and a third field indicating beamforming weight quadrature value based at least in part on identifying that the control message indicates beam weights.

Aspect 8: The method of any of aspects 6 through 7, wherein a value of zero for the first field corresponds to the control message indicating beam weights and a value of one for the first field corresponds to the control message not indicating beam weights.

Aspect 9: The method of any of aspects 1 through 8, wherein the resource RE mask and the resource symbol mask are included in a section header of the control message.

Aspect 10: The method of any of aspects 1 through 9, wherein the wireless communications device is an O-RAN radio unit and the control message is received from an O-RAN distributed unit.

Aspect 11: The method of any of aspects 1 through 10, wherein the reference signal comprises at least one of a channel state information reference signal, a positioning reference signal, a control resource set demodulation reference signal, or a combination thereof.

Aspect 12: A method for wireless communication at a wireless communications device associated with a base station, comprising: receiving a control message including a puncturing resource RE mask and a symbol mask, the puncturing resource RE mask indicating one or more frequency resources for applying a puncturing pattern and the symbol mask indicating one or more time resources for applying the puncturing pattern during a transmission; and performing the transmission in accordance with the puncturing pattern indicated in the control message including the puncturing resource RE mask and a symbol mask.

Aspect 13: The method of aspect 12, further comprising: identifying a number of puncturing patterns based at least in part on receiving a field in a section header of the control message.

Aspect 14: The method of any of aspects 12 through 13, further comprising: identifying whether the control message indicates a resource block group size and a resource block group mask based at least in part on a value of a field of the control message.

Aspect 15: The method of aspect 14, further comprising: identifying that the control message indicates the resource block group size and the resource block group mask in a set of octets based at least in part on the value of the field.

Aspect 16: The method of any of aspects 14 through 15, further comprising: identifying that the control message does not indicate the resource block group size and the resource block group mask in a set of octets based at least in part on the value of the field.

Aspect 17: The method of any of aspects 14 through 16, wherein the value of the field comprises zero or one.

Aspect 18: The method of any of aspects 12 through 17, further comprising: determining, based at least in part on the control message, that the puncturing pattern applies to a first portion of the transmission and does not apply to a second portion of the transmission, the first portion being associated with a low priority transmission and the second portion being associated with a high priority transmission.

Aspect 19: The method of aspect 18, wherein the low priority transmission comprises a physical downlink shared channel transmission and the high priority transmission comprises at least one of a channel state information reference signal transmission, a synchronization signal block transmission, a physical downlink control channel transmission, a control resource set demodulation reference signal transmission, a positioning reference signal transmission, or a combination thereof.

Aspect 20: The method of any of aspects 12 through 19, wherein the wireless communications device is an O-RAN radio unit and the control message is received from an O-RAN distributed unit.

Aspect 21: An apparatus for wireless communication at a wireless communications device associated with a base station, comprising a processor; memory coupled with the processor; and instructions stored in the memory and executable by the processor to cause the apparatus to perform a method of any of aspects 1 through 11.

Aspect 22: An apparatus for wireless communication at a wireless communications device associated with a base station, comprising at least one means for performing a method of any of aspects 1 through 11.

Aspect 23: A non-transitory computer-readable medium storing code for wireless communication at a wireless communications device associated with a base station, the code comprising instructions executable by a processor to perform a method of any of aspects 1 through 11.

Aspect 24: An apparatus for wireless communication at a wireless communications device associated with a base station, comprising a processor; memory coupled with the processor; and instructions stored in the memory and executable by the processor to cause the apparatus to perform a method of any of aspects 12 through 20.

Aspect 25: An apparatus for wireless communication at a wireless communications device associated with a base station, comprising at least one means for performing a method of any of aspects 12 through 20.

Aspect 26: A non-transitory computer-readable medium storing code for wireless communication at a wireless communications device associated with a base station, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples. Also, as used herein, the phrase "a set" shall be construed as including the possibility of a set with one member. That is, the phrase "a set" shall be construed in the same manner as "one or more" to support this interpretation.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
one or more processors;
memory coupled with the one or more processors, wherein the one or more processors are configured to:
receive a control message including a resource symbol mask and a combined resource element (RE) mask, wherein the combined RE mask is representative of a combination of port RE masks that each correspond to a respective antenna port of a plurality of antenna ports, wherein the combined RE mask indicates one or more frequency resources to be allocated for a reference signal transmission across the plurality of antenna ports and the resource symbol mask indicates one or more time resources to be allocated for the reference signal transmission across the plurality of antenna ports; and
perform the reference signal transmission in accordance with the control message including the combined RE mask and the resource symbol mask.

2. The apparatus of claim 1, wherein the
control message includes a respective port symbol mask for each antenna port of the plurality of antenna ports.

3. The apparatus of claim 2, wherein the one or more processors are configured to:
identify, based at least in part on the control message, a beam corresponding to each antenna port of the plurality of antenna ports.

4. The apparatus of claim 2, wherein
each respective port RE mask indicates one or more REs to be allocated to the respective antenna port to which the respective port RE mask corresponds for the reference signal transmission
and each respective port symbol mask indicates one or more symbol periods to be allocated to the respective antenna port to which the respective port symbol mask corresponds for the reference signal transmission.

5. The apparatus of claim 1, wherein the
control message includes a respective beam identifier field indicating a respective identifier for a respective beam to be used for each antenna port of the plurality of antenna ports.

6. The apparatus of claim 1, wherein the
the control message includes a disable beamforming weights field having a value indicative of whether the control message indicates beamforming weights.

7. The apparatus of claim 1, wherein the
control message includes a beamforming weight in-phase value field and a beamforming weight quadrature value field.

8. The apparatus of claim 1, wherein the control message includes a disable beamforming weights field having a binary value of zero or one, wherein the binary value of zero indicates that the control message indicates beam weights, and wherein the binary value of one indicates that the control message does not indicate the beam weights.

9. The apparatus of claim 1, wherein the combined RE mask and the resource symbol mask are included in a section header of the control message.

10. The apparatus of claim 1, wherein the apparatus is an open radio access network (O-RAN) radio unit and the control message is received from an O-RAN distributed unit.

11. The apparatus of claim 1, wherein the reference signal transmission comprises at least one of a channel state information reference signal, a positioning reference signal, a control resource set demodulation reference signal, or any combination thereof.

12. A method for wireless communication at a wireless communications device, comprising:
receiving a control message including a resource symbol mask and a combined resource element (RE) mask, wherein the combined RE mask is representative of a combination of port RE masks that each correspond to a respective antenna port of a plurality of antenna ports, wherein the combined RE mask indicates one or more frequency resources to be allocated for a reference signal transmission across the plurality of antenna ports and the resource symbol mask indicating one or more time resources to be allocated for the reference signal transmission across the plurality of antenna ports; and
performing the reference signal transmission in accordance with the control message including the combined RE mask and the resource symbol mask.

13. The method of claim 12,
wherein the control message includes a respective port symbol mask for each antenna port of the plurality of antenna ports.

14. The method of claim 13, further comprising:
identifying, based at least in part on the control message, a beam corresponding to each antenna port of the plurality of antenna ports.

15. The method of claim 13,
each respective port RE mask indicates one or more REs to be allocated to the respective antenna port to which the respective port RE mask corresponds for the reference signal transmission
and each respective port symbol mask indicates one or more symbol periods to be allocated to the respective antenna port to which the respective port symbol mask corresponds for the reference signal transmission.

16. The method of claim 12,
wherein the control message includes a respective beam identifier field indicating a respective identifier for a respective beam to be used for each antenna port of the plurality of antenna ports.

17. The method of claim 12,
wherein the control message includes a disable beamforming weights field having a value indicative of whether the control message indicates beamforming weights.

18. The method of claim 12,
the control message includes a beamforming weight in-phase value field and a beamforming weight quadrature value field.

19. The method of claim 12, wherein the control message includes a disable beamforming weights field having a binary value of zero or one, wherein the binary value of zero indicates that the control message indicates beam weights, and wherein the binary value of one indicates that the control message does not indicate the beam weights.

20. The method of claim 12, wherein the combined RE mask and the resource symbol mask are included in a section header of the control message.

21. The method of claim 12, wherein the wireless communications device is an open radio access network (O-RAN) radio unit and the control message is received from an O-RAN distributed unit.

22. The method of claim 12, wherein the reference signal transmission comprises at least one of a channel state information reference signal, a positioning reference signal, a control resource set demodulation reference signal, or am combination thereof.

23. An apparatus for wireless communication, comprising:
  means for receiving a control message including a resource symbol mask and a combined resource element (RE) mask, wherein the combined RE mask is representative of a combination of port RE masks that each correspond to a respective antenna port of a plurality of antenna ports, wherein the combined RE mask indicates one or more frequency resources to be allocated for a reference signal transmission across the plurality of antenna ports and the resource symbol mask indicating one or more time resources to be allocated for the reference signal transmission across the plurality of antenna ports; and
  means for performing the reference signal transmission in accordance with the control message including the combined RE mask and the resource symbol mask.

24. The apparatus of claim 23,
  the control message includes a respective port symbol mask for each antenna port of the plurality of antenna ports.

25. The apparatus of claim 24, further comprising:
  means for identifying, based at least in part on the control message, a beam corresponding to each antenna port of the plurality of antenna ports.

26. The apparatus of claim 24,
  each respective port RE mask indicates one or more REs to be allocated to the respective antenna port to which the respective port RE corresponds for the reference signal transmission
  and each respective port symbol mask indicates one or more symbol periods to be allocated to antenna port to which the respective port symbol mask corresponds for the reference signal transmission.

27. The apparatus of claim 23,
  wherein the control message includes a respective beam identifier indicating a respective identifier for a respective beam to be used for each antenna port of the plurality of antenna ports.

28. A non-transitory computer-readable medium having code for wireless communication at a network device, wherein the code is executable by the network device to:
  receive a control message including a resource symbol mask and a combined resource element (RE) mask, wherein the combined RE mask is representative of a combination of port RE masks that each correspond to a respective antenna port of a plurality of antenna ports, wherein the combined RE mask indicating one or more frequency resources to be allocated for a reference signal transmission across the plurality of antenna ports and the resource symbol mask indicating one or more time resources to be allocated for the reference signal transmission across the plurality of antenna ports; and
  perform the reference signal transmission in accordance with the control message including the combined RE mask and the resource symbol mask.

29. The non-transitory computer-readable medium of claim 28, wherein
  the control message includes a respective port symbol mask for each antenna port of the plurality of antenna ports.

30. The non-transitory computer-readable medium of claim 29, wherein the code is further executable by the network device to:
  identify, based at least in part on the control message, a beam corresponding to each antenna port of the plurality of antenna ports.

* * * * *